(12) United States Patent
Suiter (10) Patent No.: US 9,751,242 B2
(45) Date of Patent: *Sep. 5, 2017

(54) METHOD OF FORMING MOLDED PARTS

(71) Applicant: Snyder Industries, Inc., Lincoln, NE (US)

(72) Inventor: Rian Suiter, Lincoln, NE (US)

(73) Assignee: Snyder Industries, Inc., Lincoln, NE (US)

( * ) Notice: Subject to any disclaimer, the term of this patent is extended or adjusted under 35 U.S.C. 154(b) by 508 days.

This patent is subject to a terminal disclaimer.

(21) Appl. No.: 14/339,307

(22) Filed: Jul. 23, 2014

(65) Prior Publication Data

US 2016/0023383 A1     Jan. 28, 2016

(51) Int. Cl.
*B29C 41/42* (2006.01)
*B29C 41/04* (2006.01)
*B29C 45/40* (2006.01)

(52) U.S. Cl.
CPC ............ *B29C 41/42* (2013.01); *B29C 41/042* (2013.01); *B29C 45/4005* (2013.01); *B29C 2045/4031* (2013.01)

(58) Field of Classification Search
CPC ... B29C 41/42; B29C 41/042; B29C 45/4005; B29C 2045/4031
See application file for complete search history.

(56) References Cited

U.S. PATENT DOCUMENTS 5,256,048 A * 10/1993 Jacobs .................... A46D 3/00
264/243

* cited by examiner

*Primary Examiner* — Robert J Grun
(74) *Attorney, Agent, or Firm* — Hovey Williams LLP

(57) ABSTRACT

A method of forming a molded part in a mold having an ejector assembly. The ejector assembly includes an ejector arm and mounting structure. The ejector arm has a first end with a tongue that extends partially into a cavity of the mold and an opposite second end with a handle that extends outwardly from the mold cavity. The mounting structure pivotally mounts the ejector arm to the top portion of the mold so that the ejector arm may be pivoted between an operating position and an ejection position.

13 Claims, 11 Drawing Sheets

METHOD OF FORMING MOLDED PARTS

BACKGROUND

Rotational molding is a process in which a substantially hollow part is formed in a heated hollow mold that has been filled with plastic resin materials or other moldable substances. During and after heating, the filled mold is rotated, typically about several axes, to evenly disperse the heated plastic resin materials to the inside surfaces of the mold cavity. Other similar molding processes include rotocasting and spin casting. Many different types of parts and objects can be molded with these processes including pallets used for supporting and moving various types of articles.

Molded parts often adhere to the walls of their molds and are sometimes difficult to remove. Use of tools, especially metal ones, to remove a molded part can scratch or otherwise damage the inside surfaces of the mold and should therefore be avoided. Part removal can be facilitated by mold release agents applied to the interior cavity of a mold, but such mold release agents aren't always effective and sometimes leave residue on the formed parts that must be subsequently removed.

SUMMARY

The present invention solves the above-described problems and other problems by providing a mold with one or more integrated part ejector assemblies that facilitate removal of parts formed in the mold.

A mold constructed in accordance with an embodiment of the present invention is configured for rotationally molding pallets, but it may be configured for forming other parts and/or designed for other molding processes other than rotational molding. In one form, the mold includes a top mold portion, a bottom mold portion, and one or more ejector assemblies attached to the top or bottom mold.

The top and bottom mold portions define an interior mold cavity in which a pallet or other object may be formed. The mold portions have several spaced-apart semi-cylindrical openings in their sides. Each opening in the top mold aligns with a corresponding opening in the bottom mold when the top and bottom mold portions are attached to form a circular opening in the mold. The ejector assemblies are attached to the mold so as to extend through these circular opening as described below.

The ejector assemblies are provided for removing a molded part from the mold. In one embodiment, the ejector assemblies are attached to the top mold, but they may be attached to the bottom mold in other embodiments.

Each ejector assembly comprises an ejector arm and a mounting bracket or other mounting structure. The ejector arm has a first end with a tongue that extends through one of the openings in the mold and an opposite second end with a handle that extends from the mold.

The mounting structure pivotally mounts the ejector arm to the mold so that the ejector arm can be pivoted between an operating position and an ejection position. When in the operating position, the first end of the ejector arm extends partially into the mold cavity to form a harborage cavity in the molded part. When in the ejection position, the first end of the ejector arm is shifted downwardly and out of the mold cavity to urge the molded part from the cavity. Each ejector arm may be locked in its operating position by a locking pin that extends through aligned holes in the ejector arm and the mounting bracket.

The present invention also includes a method of forming pallets and other molded parts using the above-described mold. The bottom mold is first filled with plastic resin powder or other mold material. The ejector arms of the ejector assemblies are then shifted to their operating positions and the locking pins inserted to lock the ejector arms in the operating positions. The top mold is then aligned with and attached to the bottom mold with bolts or other fasteners.

The assembled mold is then transported to a rotational molding machine where it is heated, rotated, and then cooled. The top and bottom molds are then detached and separated from one another. At this point, the molded pallet or other object is still in the top mold.

The ejector assemblies are then unlocked by removing the locking pins. The ejector arms are then pivoted to their ejection positions by lifting the handles, thus causing the first ends of the ejector arms to pivot downward. As the first ends of the ejector arms are pivoted downward, their tongues urge the molded pallet out of the top mold.

While the mold is heated and rotated as described above, the ejector assemblies create harborage cavities in the sides of the pallet. The harborage cavities assist with the removal of the pallet from the top mold, but they also create voids in the pallet in which unwanted debris may accumulate. Thus, the harborage cavities may be closed by circular plugs that are spin welded or friction welded into the cavities. The plugs allow the harborage cavities to be formed of a sufficient depth to permit easy ejection of the part from the mold.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
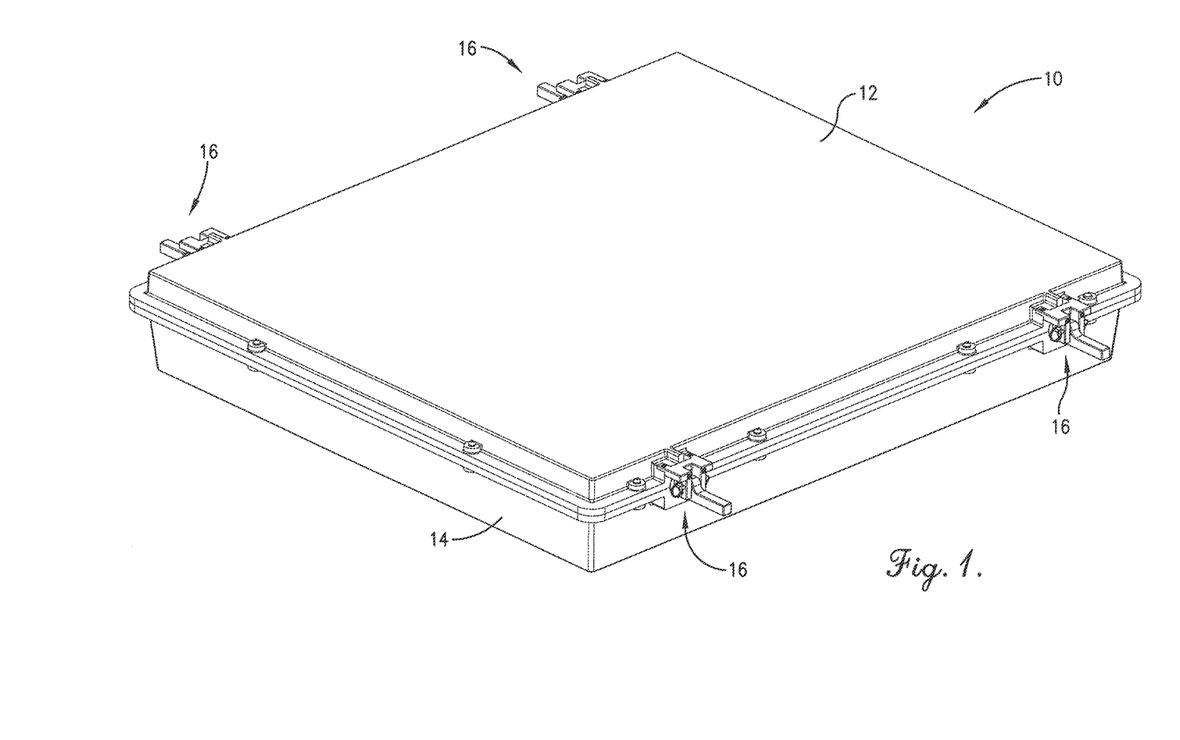
FIG. 1 is a perspective view of a pallet mold constructed in accordance with an embodiment of the present invention and shown in its closed, part forming position.

Referring now to the drawings, and initially to FIG. 1, a mold 10 constructed in accordance with an embodiment of the invention is shown. The illustrated mold is configured for rotationally molding pallets, but the principles of the present invention are not limited to pallet molds or even rotational molding processes, but instead apply to any molded products and any molding processes. One embodiment of the mold 10 broadly includes a top mold portion 12, a bottom mold portion 14, and a number of part ejector assemblies 16.

Figure 2:
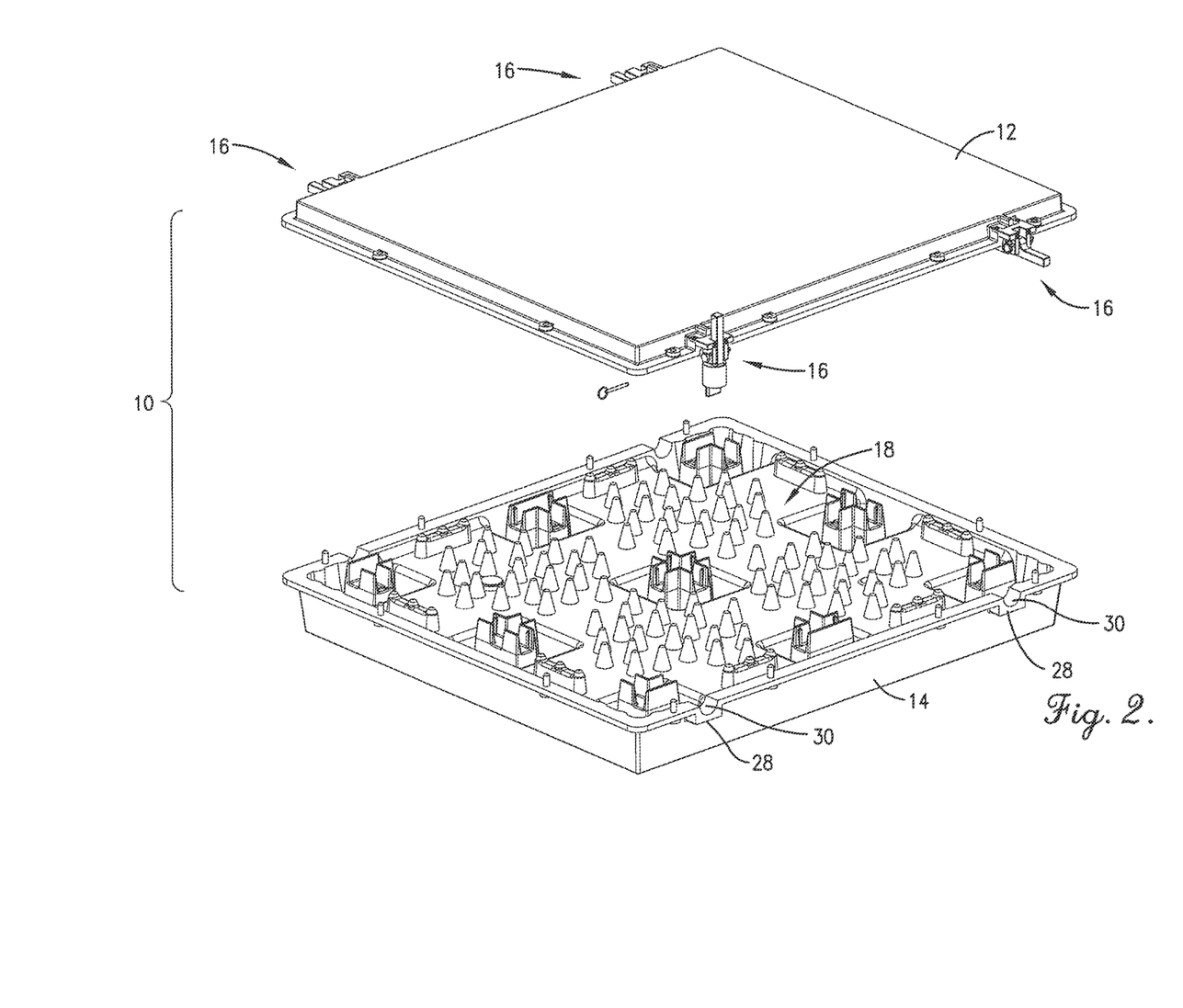
FIG. 2 is a perspective view of the pallet mold shown in its open position.

The top and bottom mold portions 12, 14 may be formed of any durable materials such as stainless steel, carbon steel, or aluminum and may be of any desired shape and size to form any desired part or object. In one embodiment, the top and bottom mold portions 12, 14 are sized and configured to form a pallet. The top and bottom mold portions 12, 14 may be attached to one another as shown in FIG. 1 while molding a part and then separated as shown in FIG. 2 to remove the part or to receive mold material for a new part. The top and bottom molds 12, 14 define an interior mold cavity 18 when attached that receives a charge or load of mold material such as plastic resin powder.

Figure 11:
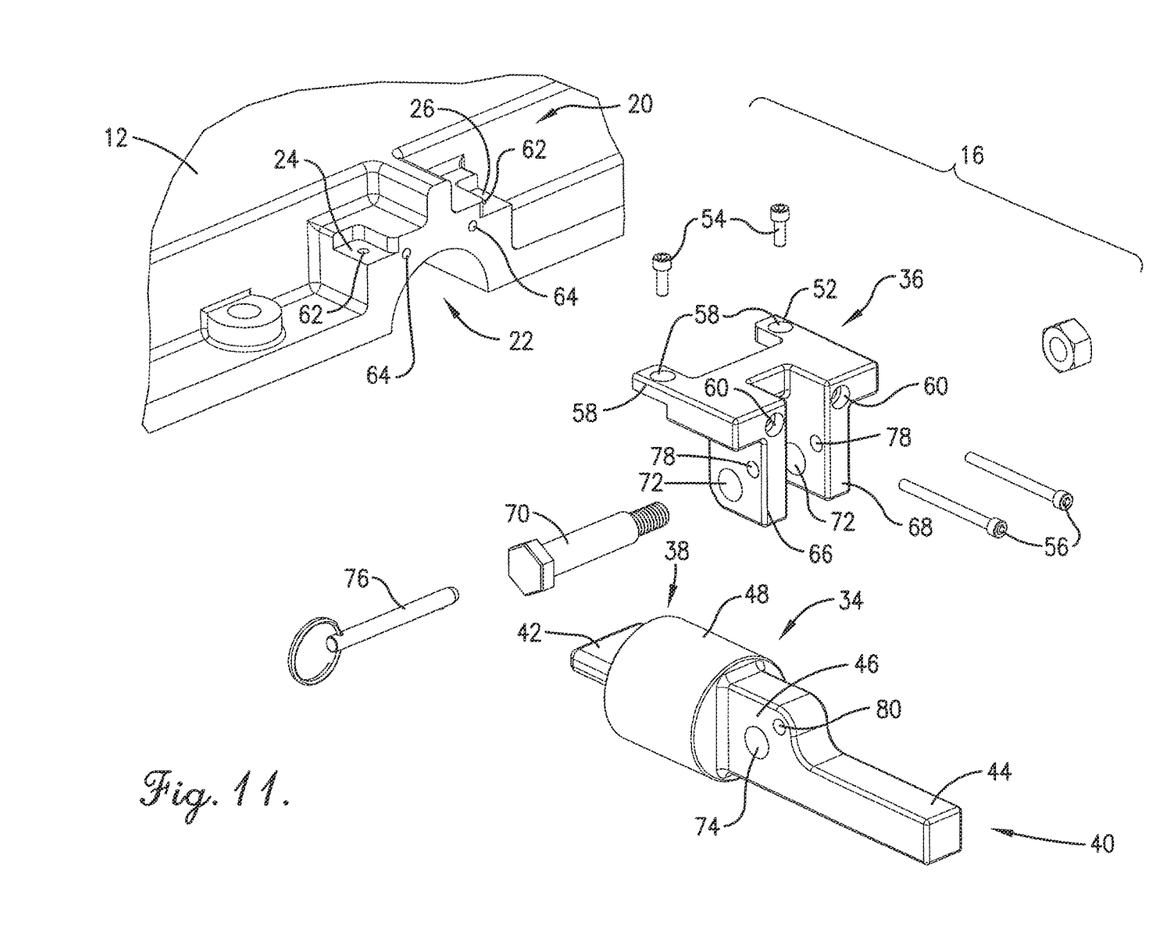
FIG. 11 is an exploded perspective view of one of the ejector assemblies and a portion of the top mold.

As best shown in FIG. 11, an embodiment of the top mold 12 has a number of spaced apart mounting flanges 20. The lower surface of each mounting flange 20 defines a semi-cylindrical opening 22 in one side of the top mold. The top surface of each mounting flange includes a pair of spaced-apart ledges 24, 26 for supporting one of the ejector assemblies 16 as described in more detail below.

Figure 7:
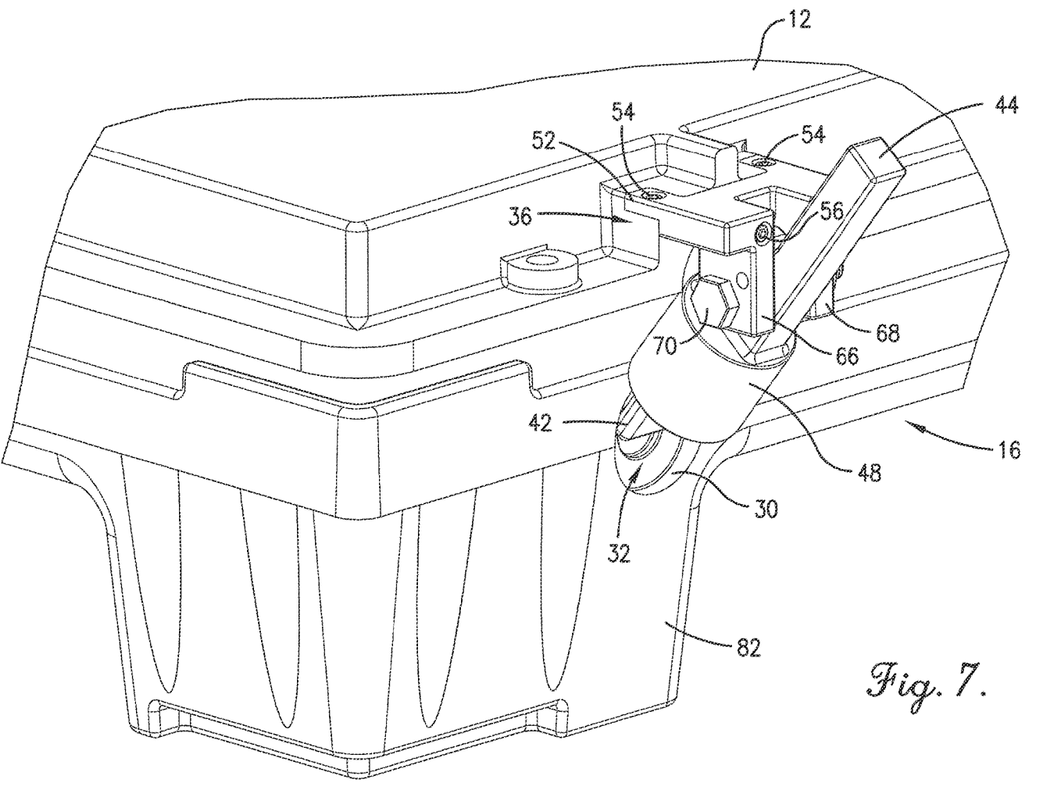
FIG. 7 is a fragmentary perspective view of the pallet mold with one ejector assembly shown between its operating position and ejection position.

As best shown in FIG. 2, the bottom mold 14 also has a number of spaced apart flanges 28, the upper surface of each defining a semi-cylindrical opening 30 in a side of the top mold. As best shown in FIG. 7, each semi-circular opening 22 in the top mold 12 aligns with one of the semi-circular openings 30 in the bottom mold 14 when the top and bottom mold portions are attached to form a circular opening 32 in the mold. In the illustrated embodiment of the mold 10, four such openings 32 are provided, but the mold may include any number of these openings. In one embodiment, the openings are approximately 2" in diameter.

The top and bottom mold portions 12, 14 may also include a number of internal recesses, protrusions, etc. for forming specific features in the molded part, but such structure is not important to the principles of the present invention and will therefore not be discussed in detail herein.

In one embodiment, the ejector assemblies 16 are attached to the top mold 12 to remove a part therefrom after the bottom mold 14 has been detached from the top mold. In other embodiments, the ejector assemblies 16 may be attached to the bottom mold 14 or to both the top and bottom molds. The illustrated embodiment of the mold includes four ejector assemblies 16, one for each opening 32 in the mold; however, any number of ejector assemblies may be provided without departing from the scope of the present invention.

As best show in FIG. 11, each ejector assembly 16 comprises an ejector arm 34 and a mounting bracket 36 or other mounting structure for pivotally mounting the ejector arm in one of the circular openings 32 in the mold.

Figure 3:
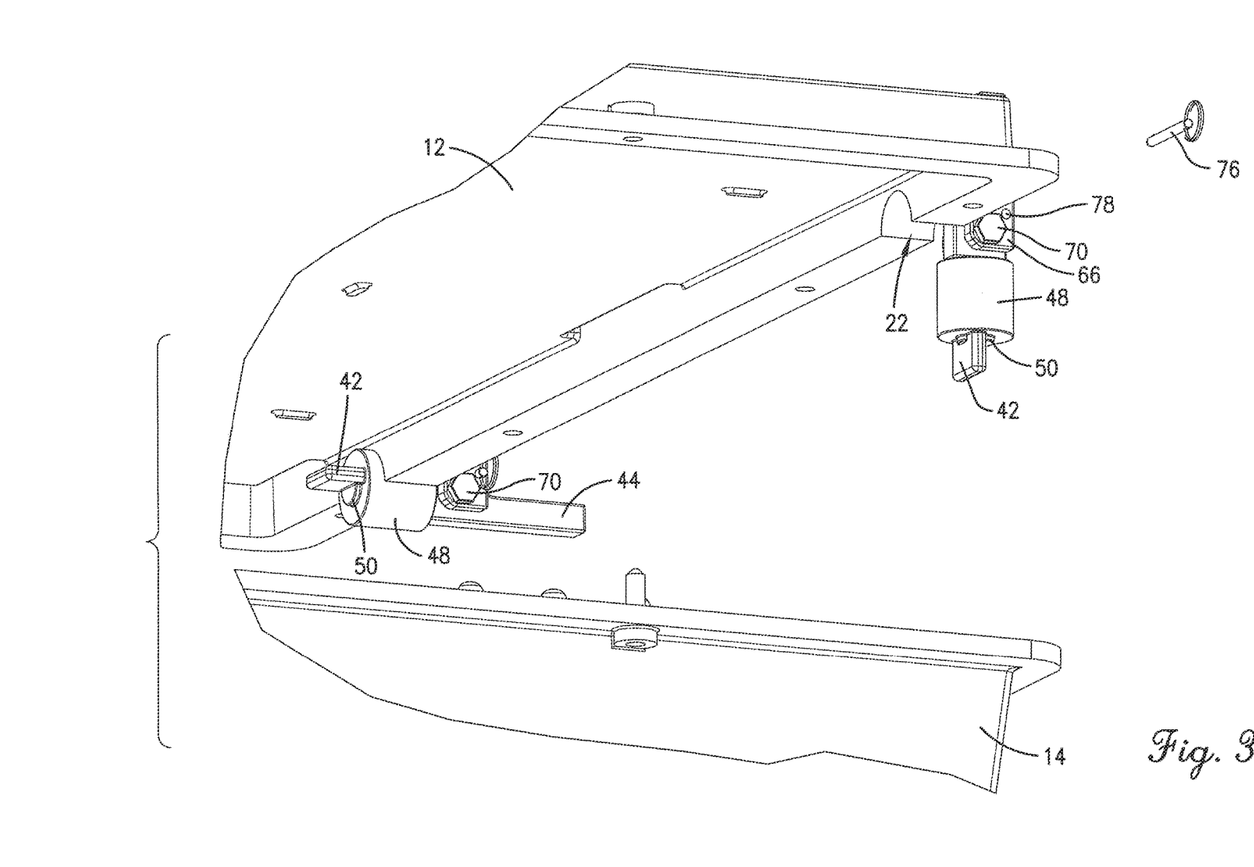
FIG. 3 is a fragmentary perspective view of the pallet mold with one of its ejector assemblies in its operating position and another ejector assembly in its ejection position.

The ejector arm 34 may be formed of any suitable material such as stainless steel and in any shape and size. The ejector arm 34 has a first end 38 that extends into the mold cavity 18 and an opposite second end 40 that extends outwardly from the mold cavity. The first end 38 includes a tongue 42 that is generally rectangular in shape. An embodiment of the tongue is 1" long, 1½" wide, and 3" thick. The second end includes a handle 44 and an enlarged pivot mount 46 between the handle and the tongue. The ejector arm may also include an enlarged cylindrical shoulder 48 positioned between the tongue 42 and the pivot mount 46 and a raised circular collar 50 (FIG. 3) around the base of the tongue. An embodiment of the shoulder is 2" in diameter, and an embodiment of the collar 50 is 1" in diameter and ³⁄₁₆" tall.

Each of the mounting brackets 36 pivotally mounts one of the ejector arms 34 to the mold so that the ejector arm can be pivoted with respect to the mold as described below. An exemplary mounting bracket 36 is shown in FIG. 11 and includes a pair of spaced apart mounting arms 52, the ends of which nest within the ledges 24, 26 on one of the mounting flanges 20. Threaded bolts, screws, or other fasteners 54, 56 may be inserted though holes 58, 60 in the arms and corresponding holes 62, 64 in the mounting flange for securing the mounting bracket 36 to the mounting flange 20.

Each mounting bracket 36 also includes a pair of spaced apart legs 66, 68. The pivot mount 46 of an ejector arm 34 is positioned between the legs 66, 68 and is pivotally secured to the mounting bracket by a bolt, rod, or other pivot shaft 70 that extends through aligned holes 72, 74 in the legs and the pivot mount 46.

Figure 4:
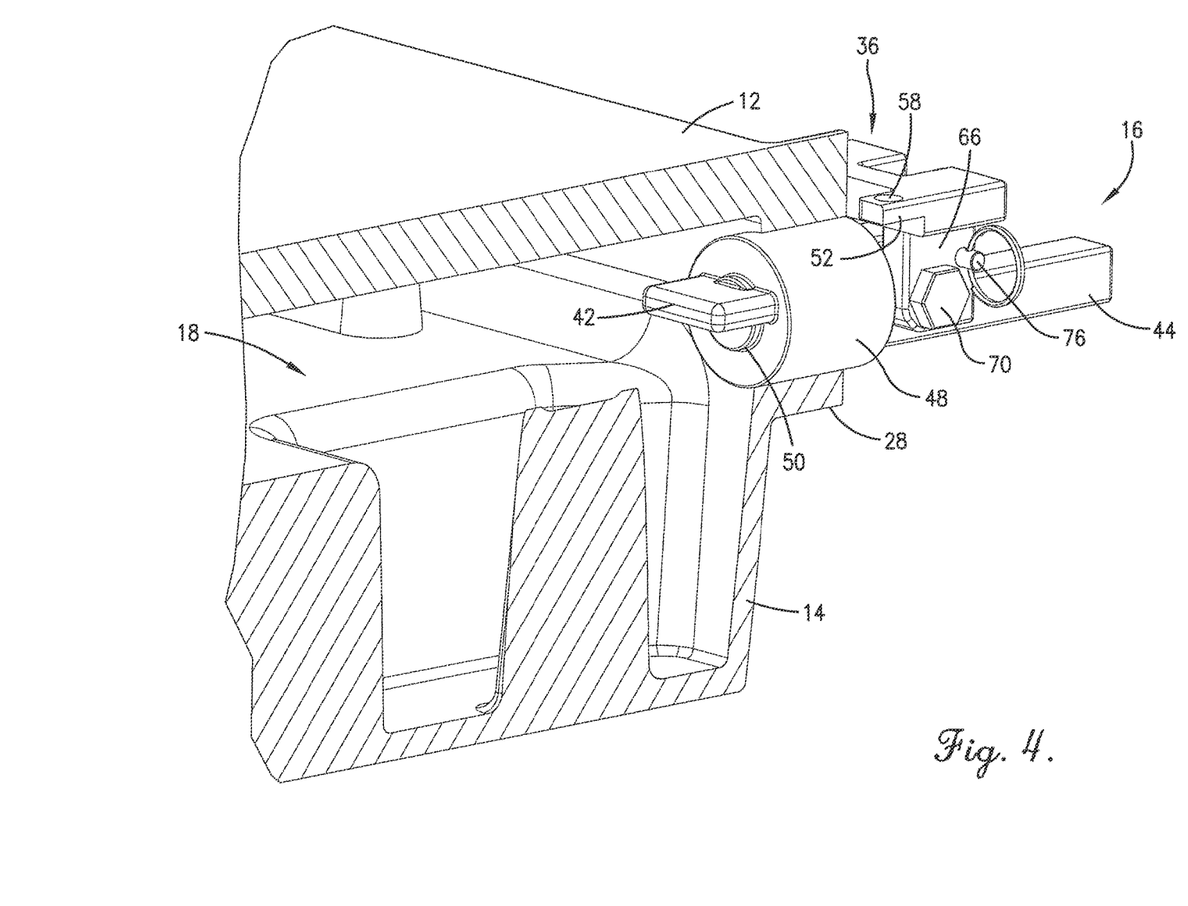
FIG. 4 is a fragmentary perspective view in vertical section of the pallet mold with one ejector assembly shown in its operating position.
Figure 5:
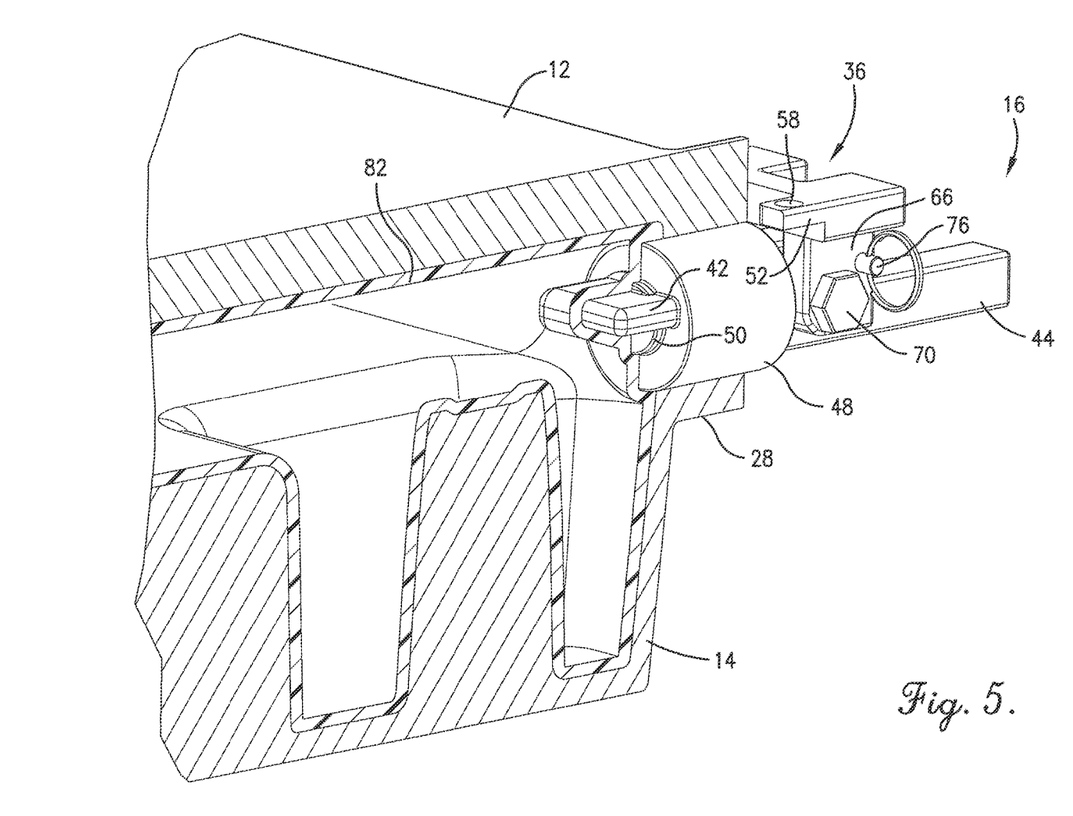
FIG. 5 is a fragmentary perspective view in vertical position of the pallet mold and a pallet that has been formed in the mold.
Figure 6:
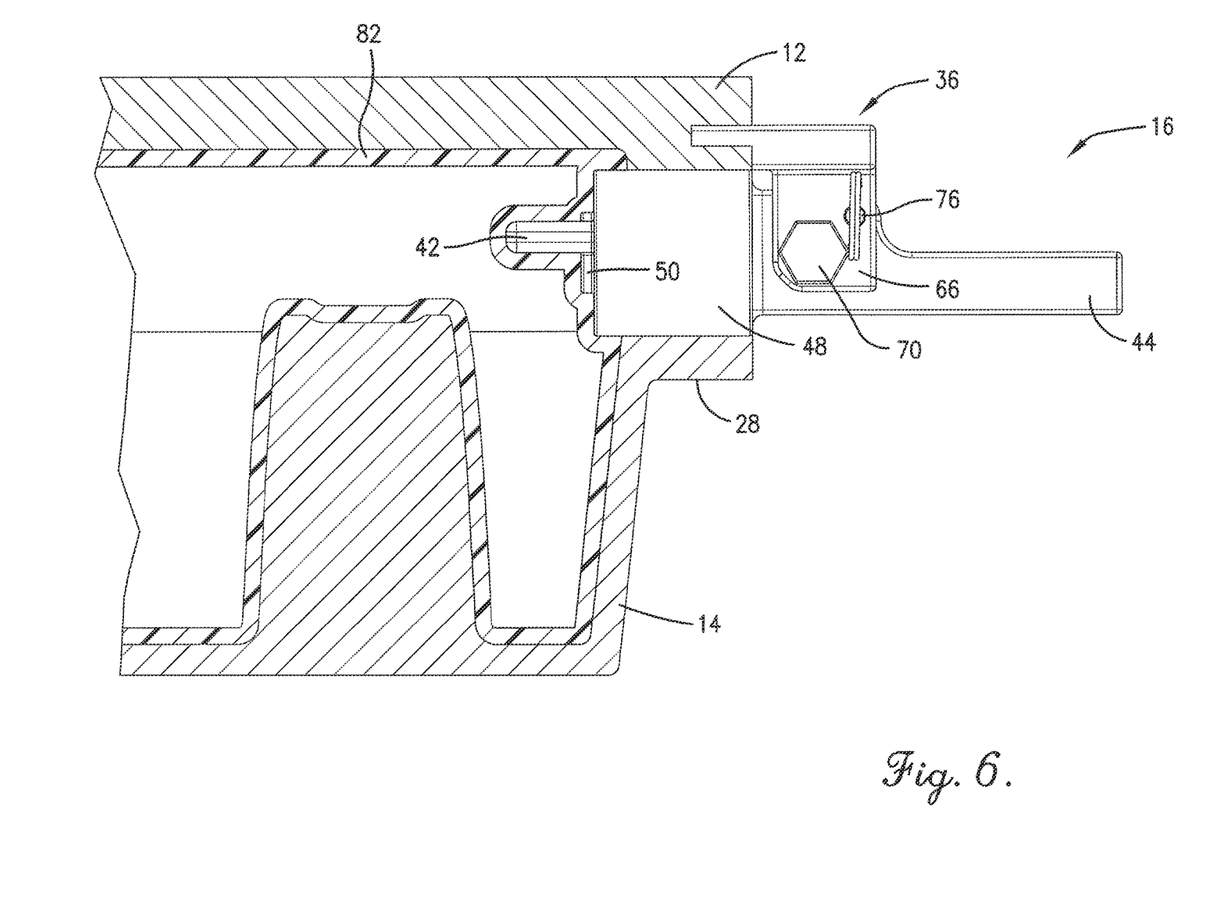
FIG. 6 is a fragmentary elevational view in vertical section of the pallet mold and a pallet that has been formed in the mold.
Figures 9, 10:
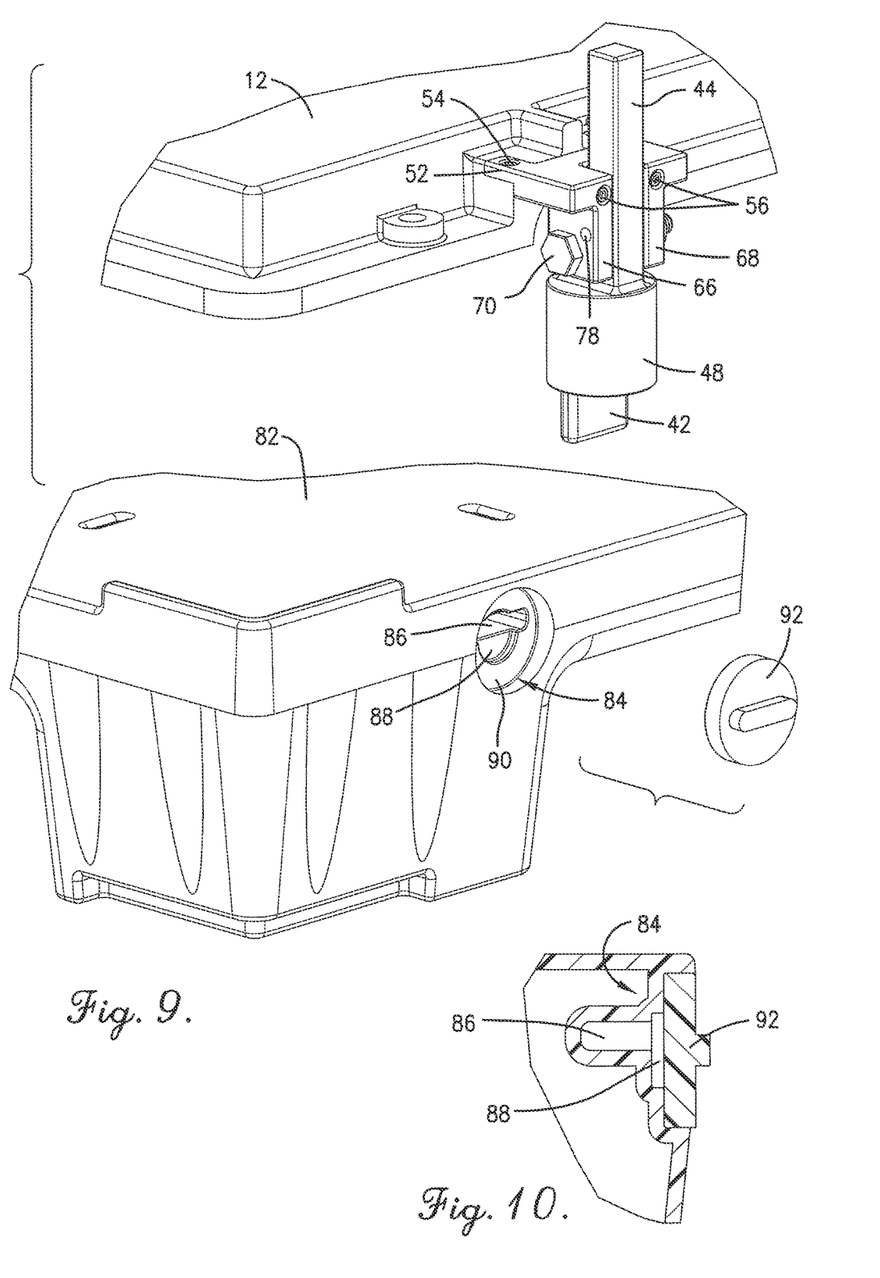
FIG. 9 is a fragmentary perspective view of the top mold and a pallet released from the top mold.
FIG. 10 is a fragmentary vertical sectional view of a harborage cavity of a pallet and a plug that has been spin welded into the harborage cavity.

Each mounting bracket 36 permits its ejector arm 34 to pivot between an operating position shown in FIGS. 4 and 5 and an ejection position shown in FIG. 9. When in the operating position, the first end of the ejector arm 34, including its tongue 42, extend partially into the mold cavity 18. When in the ejection position, the first end of the ejector arm is shifted downwardly and out of the mold cavity. As described in more detail below, the ejector assemblies 16 are shifted to their operating positions when forming a part in the mold and then subsequently shifted to their ejection positions to release the part from the mold.

Each ejector arm 34 may be locked in its operating position by a locking pin 76 that extends through aligned holes 78, 80 in the ejector arm and the legs of the mounting bracket.

Figure 12:
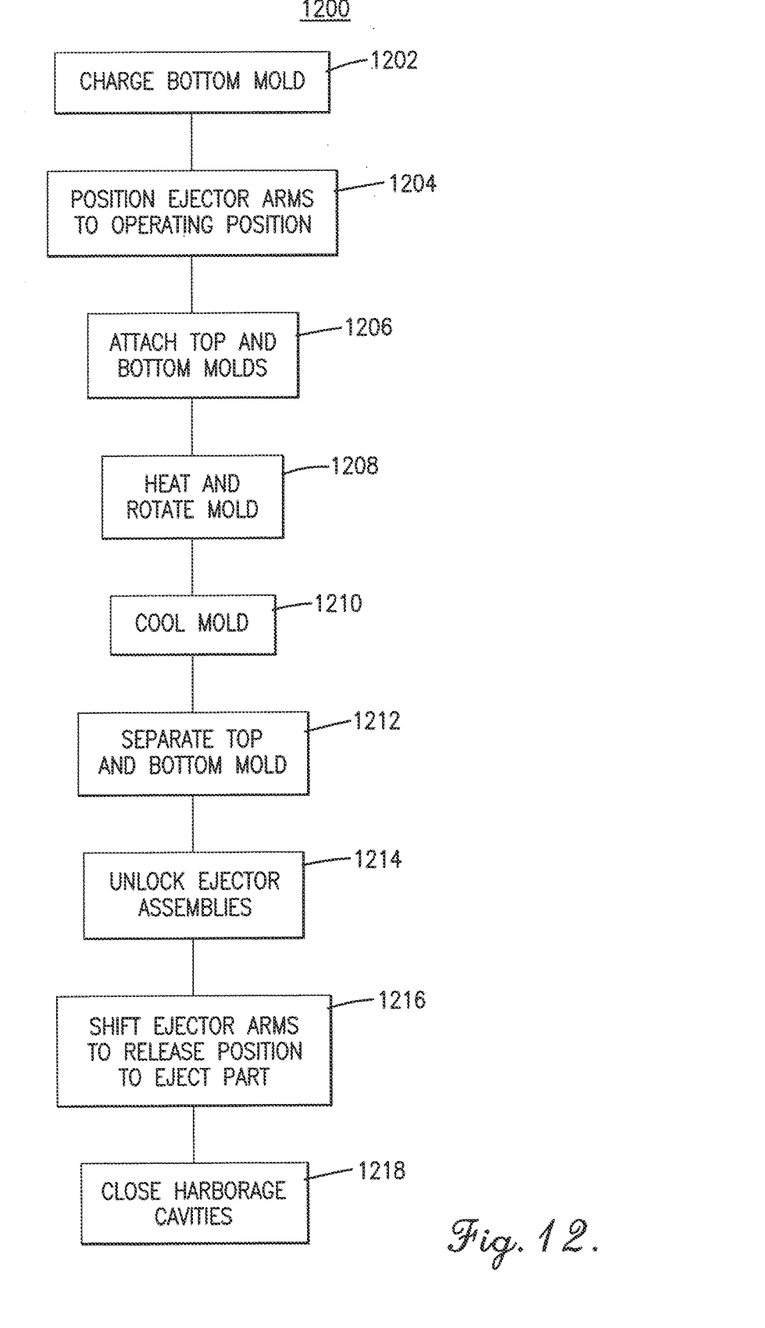
FIG. 12 is a flow diagram depicting steps in an exemplary method of forming a molded pallet or other object with the mold shown in FIGS. 1-11.

A method 1200 of forming molded parts such as pallets using the above-described mold 10 will now be described primarily with reference to FIG. 12. Unless otherwise noted, the steps do not have to be performed in the exact order shown and described herein.

The bottom mold 14 is first filled with plastic resin powder or other material as depicted in step 1202. The powder or other material should be spread throughout the mold bottom to expose the material to as much of the mold as possible. If a steel reinforced part is to be formed in the mold, the steel should be inserted in the bottom mold before the plastic resin material is deposited in the mold. Date stamps and other items may also be placed in the bottom mold.

Before or after the plastic resin powder is added to the bottom mold, the ejector arms 34 of all the ejector assemblies 16 should be shifted to their operating positions as depicted in step 1204. The locking pins are then inserted through the mounting brackets 34 and ejector arms 34 to lock the ejector arms in place.

The top mold 12 is then aligned with and attached to the bottom mold 14 with bolts or other fasteners as depicted in step 1206. The assembled mold may then be transported to a rotational molding machine where it is heated and rotated in a conventional manner as depicted in step 1208. The rotational molding machine may be a rock and roll type machine, a clamshell type machine, an up & over type machine, a shuttle type machine, a swing arm type machine, a carousel type machine, or any other conventional rotational molding machine.

The mold 10 is then cooled in the rotational molding machine as depicted in step 1210. The cooling may be facilitated by fans, blowers, heat exchangers, and/or other cooling devices.

Figure 8:
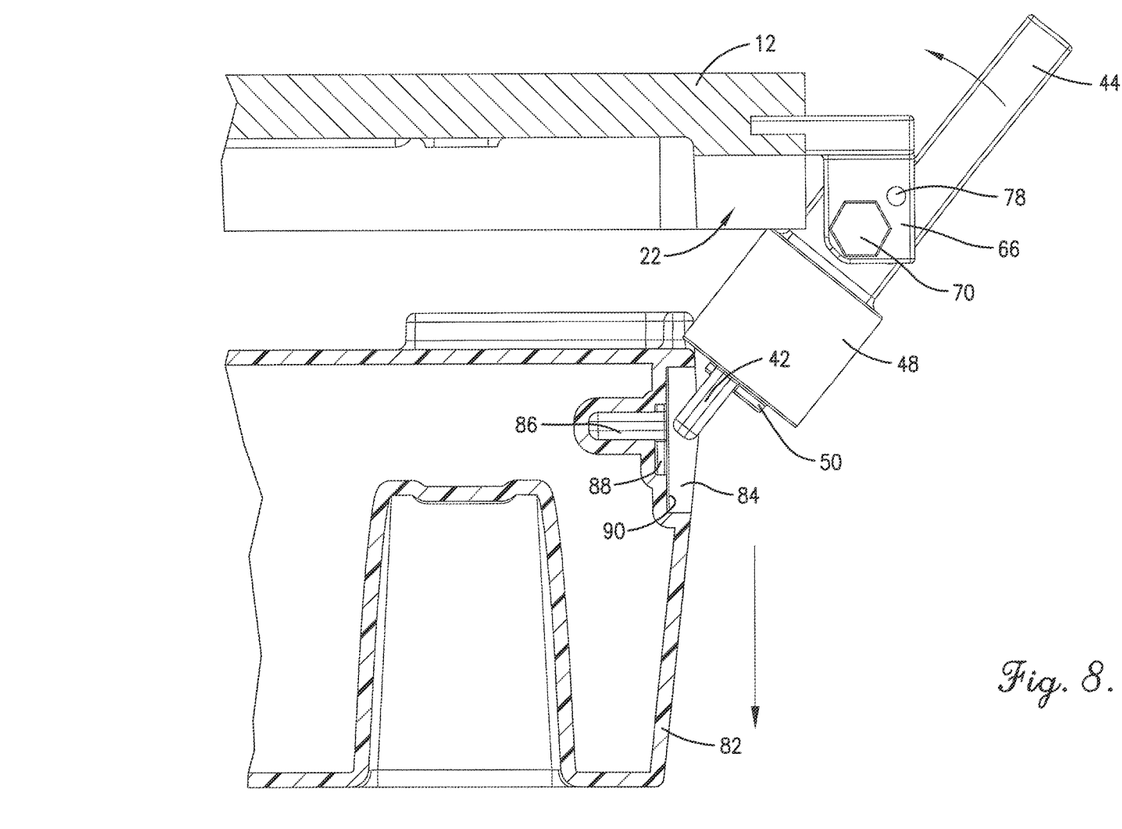
FIG. 8 is a fragmentary elevational view in partial vertical section of the top mold and a pallet that is being released from the top mold.

The top and bottom molds 12, 14 are then separated from one another as depicted in step 1212. In one embodiment, an overhead crane may be used to lift the top mold 12 from the bottom mold 14. The exemplary mold 10 is designed such that the formed part stays in the top mold 12 when the top and bottom molds are separated as best depicted in FIGS. 7 and 8. In other embodiments, the mold may be configured such that the formed part stays in the bottom mold.

The ejector assemblies 16 are then unlocked by removing the locking pins 76 as depicted in step 1214. The ejector arms 34 are then pivoted to their ejection positions as depicted in step 1216 by lifting the handles 44, thus causing the opposite first ends 38 of the ejector arms to pivot downward. A pry bar with a hollow end may be placed over the handles to assist with the lifting of the handles. As the first ends 38 of the ejector arms are pivoted downward, their tongues 42 urge the formed part out of the top mold as show in FIGS. 8 and 9.

An exemplary pallet 82 that may be formed in the mold is shown in FIG. 7. The pallet may include a deck; a number of feet or other support members depending from the deck; and features formed in the pallet to assist with stacking.

While the mold is heated and rotated as describe above, the ejector assemblies 16 create harborage cavities 84 in the sides of the pallet as best illustrated in FIGS. 8-10. One exemplary harborage cavity 84 is shown in FIG. 10 and includes a generally rectangular and horizontally-extending slot 86 formed by the tongue 42 of an ejector arm. The slot 86 has inside dimensions that correspond to the outside dimensions of the tongue. Thus, in one embodiment, the slot is 1" deep, 1½" wide, and ⅜" tall. The harborage cavity 84 also has a circular recess 88 surrounding the slot 86 that is formed by the raised collar 50 on the ejector arm. The circular recess 88 is the same size as the raised collar, and in one embodiment is 3/16" deep, and 1" in diameter. Finally, the harborage cavity has a larger diameter circular recess 90 formed by the end of the cylindrical shoulder 48 of the ejector arm 34. In one embodiment, the circular recess is 7/16" deep and 2" in diameter.

The above-described harborage cavities assist with the removal of the formed part from the top mold, but they also create voids in the pallet in which unwanted debris may accumulate. Thus, in one embodiment, the harborage cavities are closed by circular plugs 92 that are spin welded or friction welded into the cavities. The plugs allow the harborage cavities to be formed deeply enough to facilitate ejection of parts from the mold while subsequently closing and sealing the harborage cavities.

Although the invention has been described with reference to the preferred embodiment illustrated in the attached drawing figures, it is noted that equivalents may be employed and substitutions made herein without departing from the scope of the invention as recited in the claims. For example, the particular sizes, shapes, and materials described herein may be altered without departing from the scope of the invention.

Having thus described the preferred embodiment of the invention, what is claimed as new and desired to be protected by Letters Patent includes the following:

1. A method of forming a part comprising:
    attaching an ejector assembly to a mold having a bottom mold portion and a top mold portion that cooperatively define a mold cavity, the ejector assembly including—
        an ejector arm having a first end and an opposite second end; and
        mounting structure for pivotally mounting the ejector arm to the mold;
    depositing plastic resin material into the bottom mold;
    shifting the ejector arm to an operating position in which the first end of the ejector arm extends in to the mold cavity;
    covering the bottom mold with the top mold;
    rotating the mold about at least one axis;
    separating the top mold from the bottom mold; and
    removing the part from either the top mold or bottom mold by pivoting the ejector arm relative to the mold to an ejection position such that the first end of the ejector arm urges the molded part from the mold.

2. The method as set forth in claim 1, wherein the first end of the ejector arm includes a tongue that extends generally horizontally into the mold cavity when the ejector arm is shifted to the operating position, wherein the tongue is generally rectangular in shape such that it forms a generally rectangular and horizontally-extending slot in the molded part.

3. The method as set forth in claim 2, wherein the ejector arm assembly further includes—
   a cylindrical shoulder between the tongue and the handle that extends partially into the mold cavity with the tongue so as to form a cylindrical recess in the molded part adjacent the horizontally extending slot.

4. The method as set forth in claim 1, further comprising spin welding a plug over a harborage cavity formed in the part by the ejector arm to close and seal the harborage cavity.

5. The method as set forth in claim 1, wherein the attaching step comprises attaching four of the ejector assemblies to the mold.

6. A method of forming a part comprising:
   attaching a number of ejector assemblies to a mold having a bottom mold portion and a top mold portion that cooperatively define a mold cavity, each ejector assembly including—
      an ejector arm having a first end with a tongue and an opposite second end with a handle: and
      mounting structure for pivotally mounting the ejector arm to the top mold portion;
   depositing plastic resin material into the bottom mold;
   shifting the ejector arm to an operating position in which the tongue of the first end of the ejector arm extends in to the mold cavity;
   covering the bottom mold with the top mold;
   rotating the mold about at least one axis;
   heating the mold;
   cooling the mold;
   separating the top mold from the bottom mold;
   removing the part from the top mold by pivoting the ejector arms relative to the mold to ejection positions such that the tongues of the ejector arms urge the molded part from the mold; and
   covering a harborage cavity formed in the part by the ejector arms.

7. The method as set forth in claim 6, wherein four of the ejector arms are attached to the mold.

8. The method as set forth in claim 6, wherein each of the ejector arm assemblies further includes—
   a cylindrical shoulder between the tongue and the handle that extends partially into the mold cavity with the tongue so as to form a cylindrical recess in the molded part adjacent the horizontally extending slot.

9. The method as set forth in claim 6, wherein the covering step comprises spin welding a plug over the harborage cavity to dose and seal to harborage cavity.

10. A method of forming a part comprising:
    attaching a number of ejector assemblies to a mold having a bottom mold portion and a top mold portion that cooperatively define a mold cavity, each ejector assembly including—
       an ejector arm having a first end with a tongue and an opposite second end with a handle; and
       mounting structure for pivotally mounting the ejector arm to the top mold portion;
    depositing plastic resin material into the bottom mold;
    shifting the ejector arm to an operating position in which the tongue on the first end of the ejector arm extends in to the mold cavity;
    covering the bottom mold with the top mold;
    rotating the mold about several axes while simultaneously heating the mold;
    cooling the mold;
    separating the top mold from the bottom mold;
    removing the part from the top mold by pivoting the ejector arms relative to the mold to ejection positions such that the tongues of the ejector arms urge the molded part from the mold; and
    covering a harborage cavity formed in the part by the ejector arm.

11. The method as set forth in claim 10, wherein four of the ejector arms are attached to the mold.

12. The method as set forth in claim 10, wherein each of the ejector arm assemblies further includes—
    a cylindrical shoulder between the tongue and the handle that extends partially into the mold cavity with the tongue so as to form a cylindrical recess in the molded part adjacent the horizontally extending slot.

13. The method as set forth in claim 10, wherein the covering step comprises spin or friction welded welding the plug over a harborage cavity.

* * * * *